US005588759A

United States Patent [19]
Cloud

[11] Patent Number: 5,588,759
[45] Date of Patent: Dec. 31, 1996

[54] WRIST SUPPORT FOR EXPANDABLE KEYBOARDS

[75] Inventor: Gene Cloud, Boise, Id.

[73] Assignee: Micron Technology, Inc., Boise, Id.

[21] Appl. No.: 587,418

[22] Filed: Jan. 11, 1996

[51] Int. Cl.⁶ ........................................................ B41J 5/10
[52] U.S. Cl. ............................................ 400/472; 361/680
[58] Field of Search ................................. 400/472, 489; 361/680; 341/21, 22, 23; 345/168

[56] References Cited

U.S. PATENT DOCUMENTS

| | | | |
|---|---|---|---|
| D. 314,205 | 1/1991 | Lang et al. | D18/1 |
| 5,044,798 | 9/1991 | Roylance et al. | 400/472 |
| 5,141,343 | 8/1992 | Roylance et al. | 400/472 |
| 5,163,765 | 11/1992 | Levy | 400/492 |
| 5,187,644 | 2/1993 | Crisan | 361/393 |
| 5,267,127 | 11/1993 | Pollitt | 361/680 |
| 5,519,569 | 5/1996 | Sellers | 361/680 |
| 5,519,570 | 5/1996 | Chung | 361/680 |

*Primary Examiner*—Edgar S. Burr
*Assistant Examiner*—Dave A. Ghatt
*Attorney, Agent, or Firm*—Craig M. Korfanta

[57] ABSTRACT

An expandable keyboard with three degrees of freedom in the translation assembly which allows the lower keyboard section to move: forward, the second degree of freedom; up, the third degree of freedom; and out, the first degree of freedom, to expand the keyboard. In the collapsed position, the lower keyboard section rests below a fixed wrist support which forms a portion of the housing for the device.

16 Claims, 20 Drawing Sheets

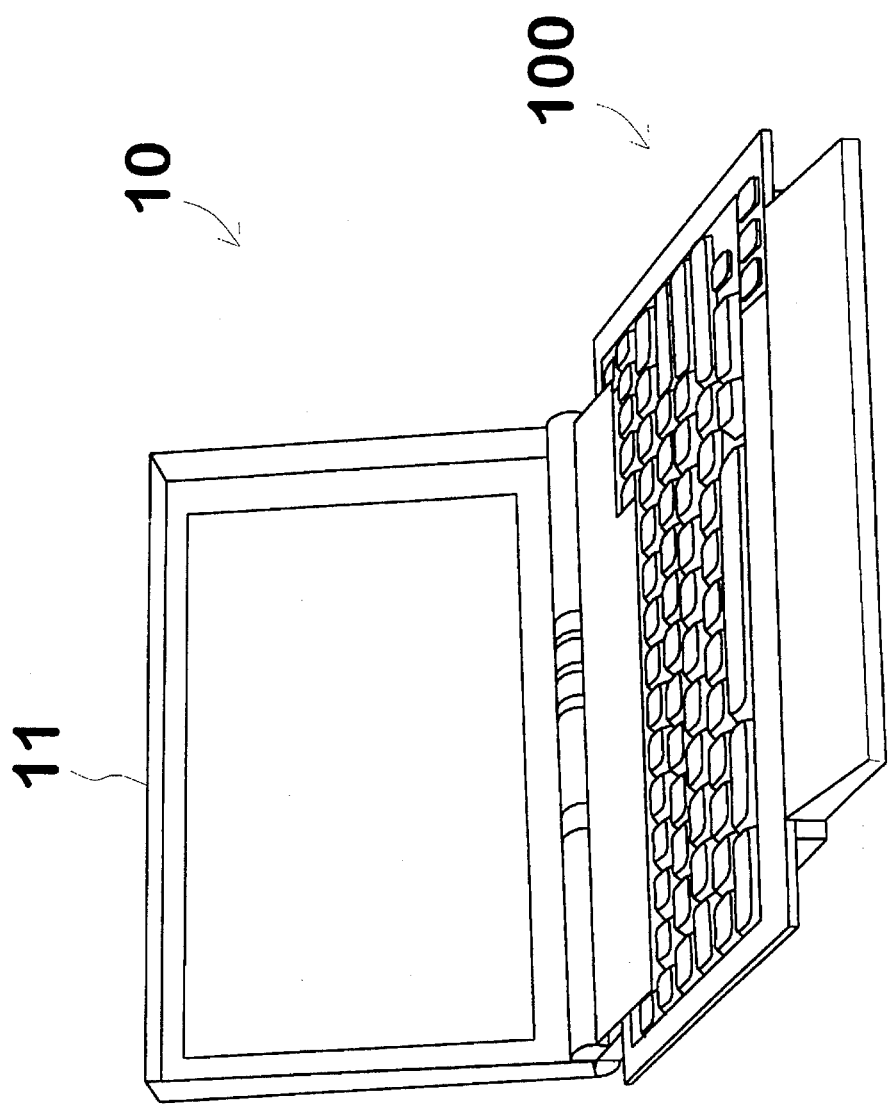

WRIST SUPPORT FOR EXPANDABLE KEYBOARDS

BACKGROUND OF THE INVENTION

1. Technical Field

This invention generally relates to portable electronic devices having keyboards. More particularly, this invention relates to a wrist support or rest for portable electronic devices having expandable keyboards.

2. Background

Small portable electronic devices, e.g. laptop and notebook computers, use smaller keyboards than their desktop counterparts to reduce the overall footprint of the portable device. This is recognized as a problem in the industry as users prefer full size keyboards. Recently, IBM® introduced the ThinkPad 701C model of notebook computers which incorporates an expandable keyboard which expands and contracts transversely between a full size keyboard and a compressed footprint size for storage. Representations of this product appear in FIGS. 1A–1C. The keyboard is roughly divided in half into two sections along a stairstepped diagonal line. The lid (screen) of the notebook activates a mechanical translation assembly which siftils the left side of the keyboard to the left, with only a single degree of freedom. The translation assembly also shifts the right side of the keyboard to the right and then back toward the user using two degrees of freedom, to expand the keyboard. Conversely, as the lid is closed the process is reversed. Other manufacturers are working on other designs to provide similar functionality.

Another problem with all keyboards, which isn't unique to just small keyboards, is the provision of a wrist support to position the wrists ergonomically to help prevent repetitive task injuries like carpel tunnel syndrome. This problem is exacerbated by the small keyboards typical of portable electronic devices. None of the manufacturers of these devices, at least those of which the inventor is aware, addresses the provision of a wrist support for an expandable keyboard.

It is therefore one object of the present invention to provide a wrist support configuration and keyboard translation assembly for an expandable keyboard to provide a larger size keyboard with a wrist rest.

SUMMARY OF THE INVENTION

According to the present invention, this object and other objects are achieved by an expandable keyboard with three degrees of freedom in the translation assembly which allows the lower keyboard section to move: forward, the second degree of freedom; up, the third degree of freedom; and out, the first degree of freedom, to expand the keyboard. In the collapsed position, the lower keyboard section rests below a fixed wrist support which forms a portion of the housing for the device.

The translation assembly for the expandable keyboard has to provide for two additional considerations over the translation assembly discussed in the background section of this specification. First is the provision of the third degree of freedom. The lower section of the keyboard must move between a vertical position roughly in the plane of the keyboard and a vertical position below the plane of the keyboard below the wrist rest. Second, the upper keyboard section must move out past its final expanded position during the transformation between the expanded and collapsed states to provide clearance for the lower keyboard section as it clears the wrist rest and raises into the plane of the keyboard.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 2 is a perspective representation of a portable notebook sized computer having an expandable keyboard and wrist rest according to the invention;

DETAILED DESCRIPTION OF THE INVENTION

Figure 1A:
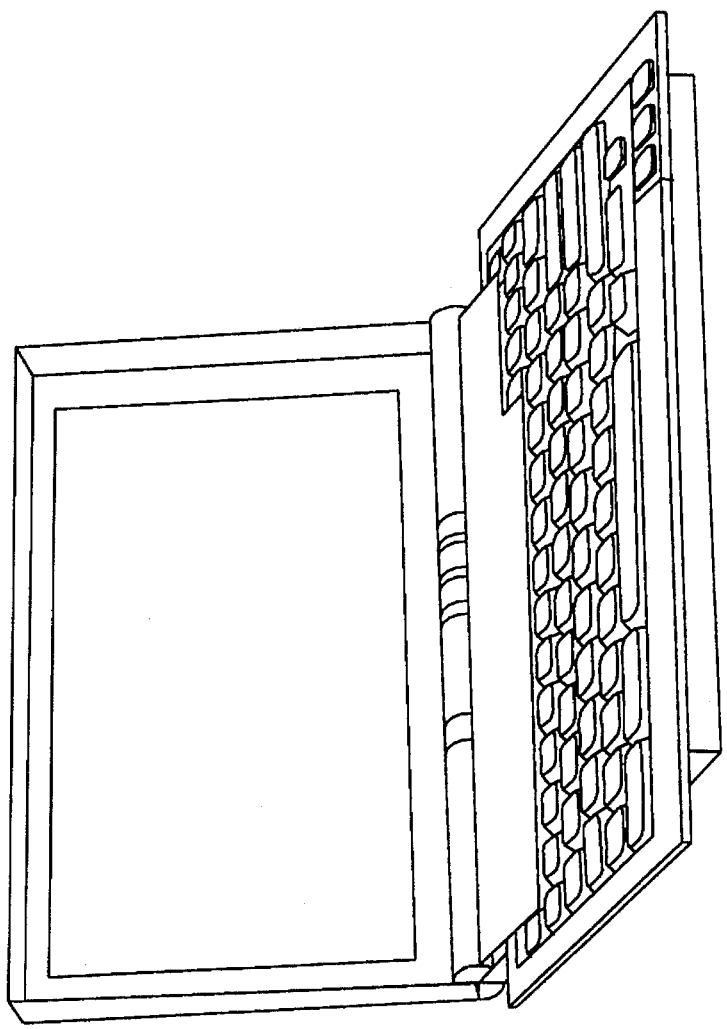
FIG. 1A is a perspective representation of a prior art notebook computer with an expandable keyboard, illustrated in a fully open and expanded position.
Figure 1B:
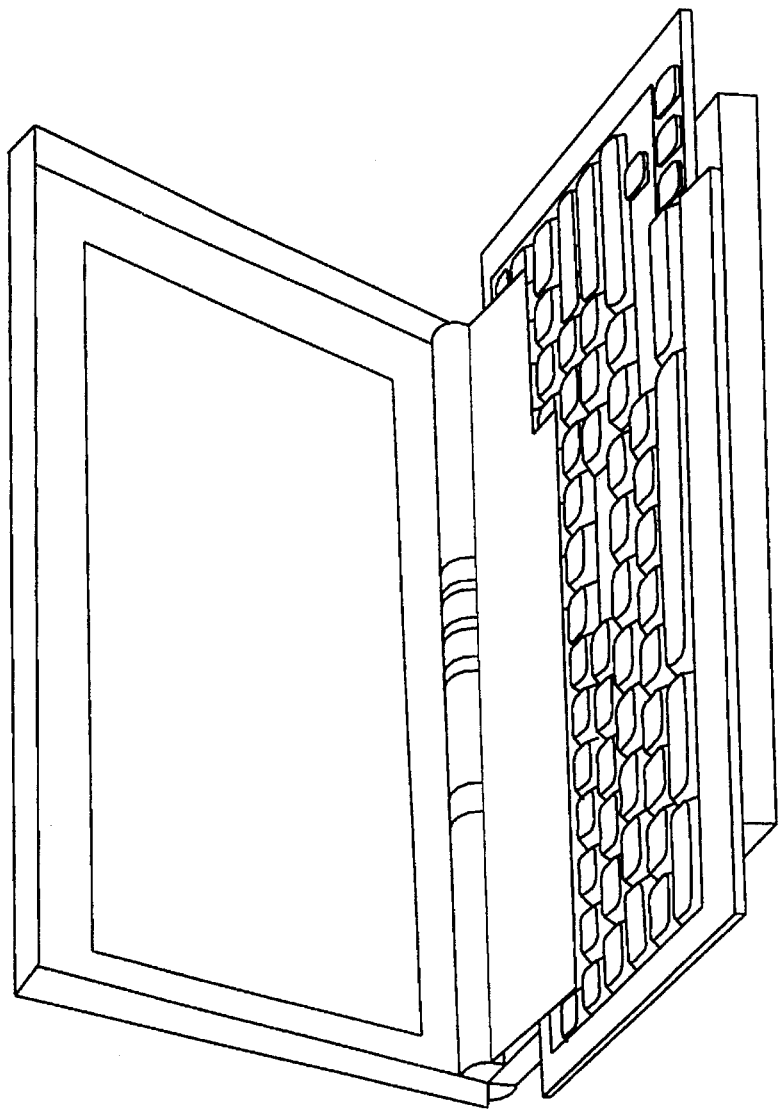
FIG. 1B is a perspective representation of the prior art device in FIG. 1 in an approximately halfway closed position.
Figure 1C:
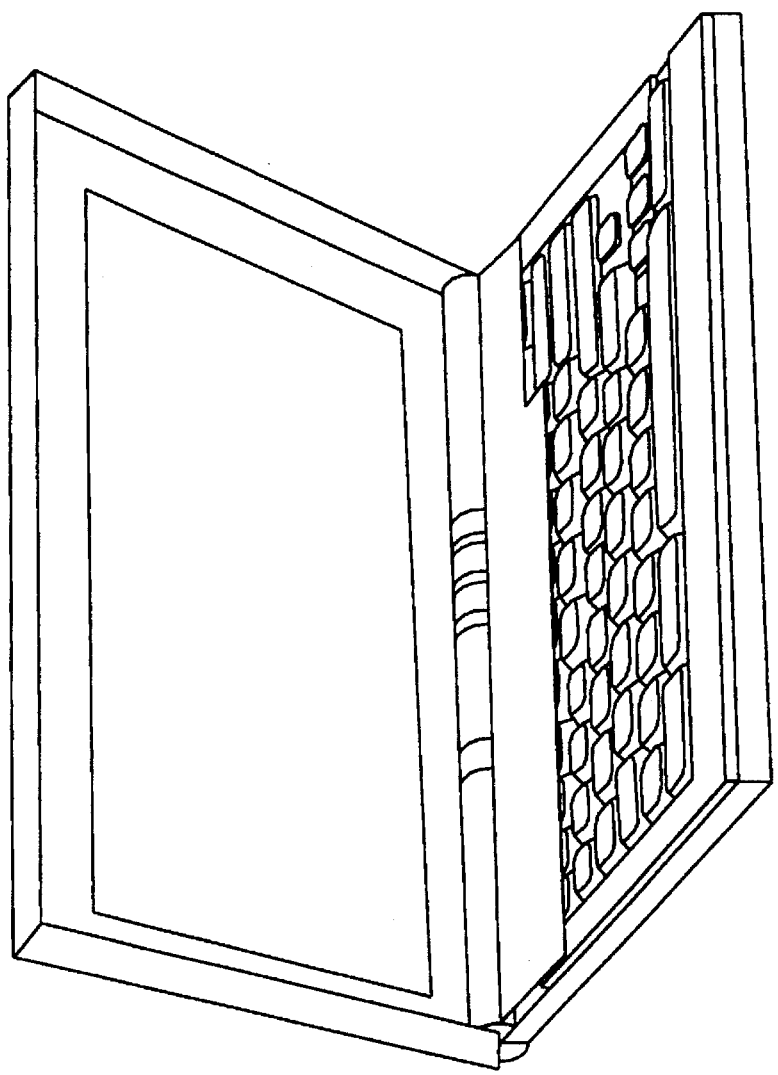
FIG. 1C is a perspective representation of the prior art device in FIG. 1 in an almost closed position.
Figure 3:
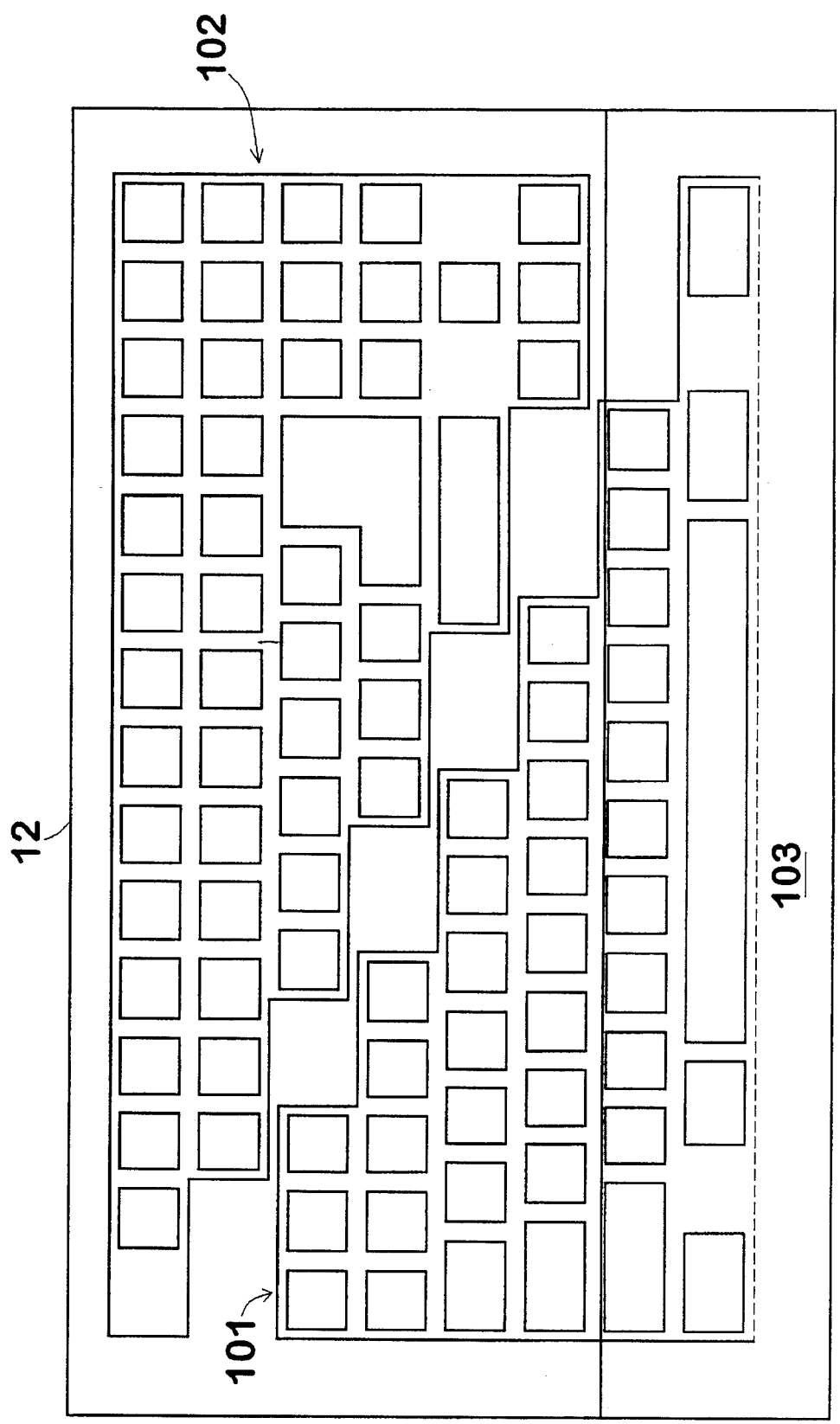
FIG. 3 is a top representation of the device of FIG. 2 in a collapsed position with the screen/lid removed for purposes of illustration.
Figure 4:
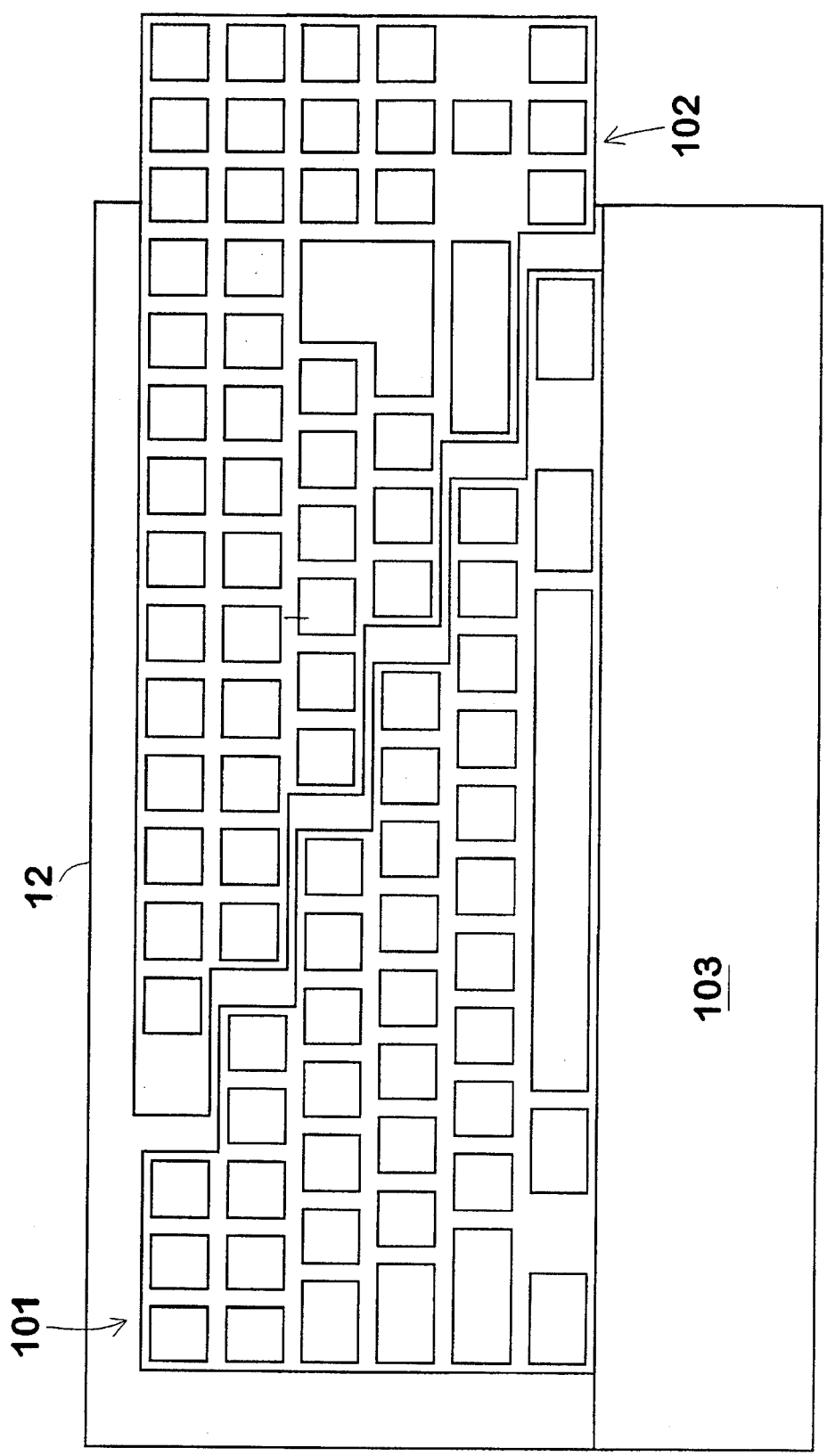
FIG. 4 is a top representation of the device of FIG. 2 in a partially expanded position with the screen/lid removed for purposes of illustration.
Figure 5:
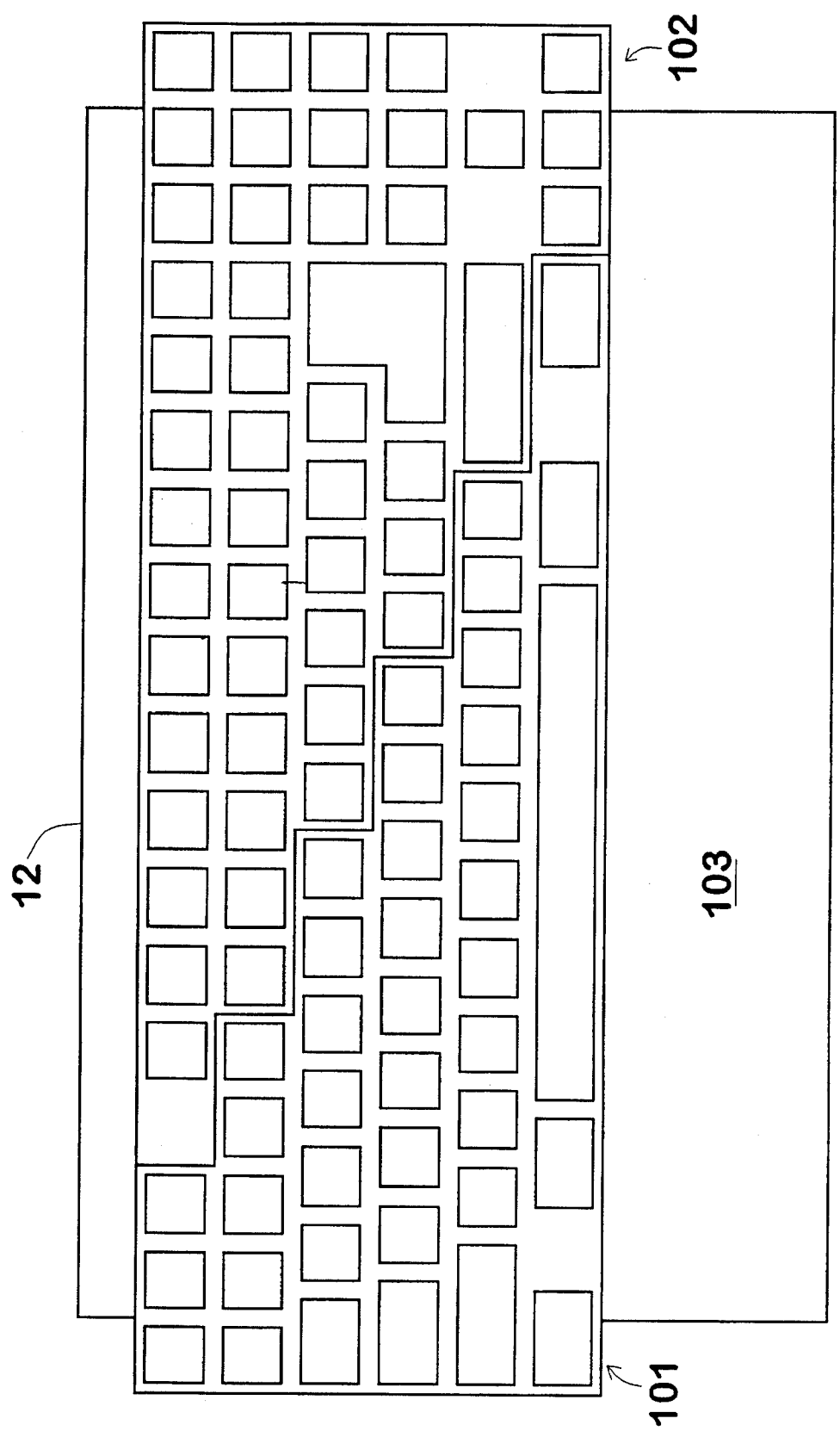
FIG. 5 is a top representation of the device of FIG. 2 in a fully expanded position with the screen/lid removed for purposes of illustration.

Referring now to FIGS. 2–18, an expandable keyboard with a built-in wrist rest, the combination of which is here generally designated as 100, is incorporated into a portable electronic device. For the purposes of explanation and illustration, the electronic device is here a notebook computer, designated in the drawings as 10, which has a main housing 12 to which a screen/lid 11 is hingedly attached via hinges 13. It should be noted that the invention is equally applicable to other small or portable electronic devices which employ keyboards.

Expandable keyboard with wrist rest 100, hereinafter simply keyboard 100, has a left keyboard section 101 and a right keyboard section 102 which together form a full keyboard which is close to standard size. The full keyboard is divided along a diagonal line in stair step fashion, here extending from the upper left-hand corner of the keyboard to the lower right-hand corner. A hinge activated translation assembly moves the keyboard sections between a contracted or collapsed position when the screen/lid of notebook computer 10 is closed and an expanded position when screen/lid 11 is open. In the collapsed position, left keyboard section 101 is contracted inwardly toward the center of notebook computer 10 and is pulled down below the plane of right keyboard section 102 and the top surface of wrist rest portion 103 into a cavity 104 under wrist rest portion 103. At the same time, right keyboard section 102 is contracted inwardly toward the center of notebook computer 10. This expansion and contraction scheme requires that one keyboard section, here leer section 101, have three degrees of freedom while the other section, here right section 102, has one degree of freedom. Additionally, to prevent interference between the left and right keyboard sections, one of the keyboard sections, here right section 102, expands out past its final resting point and partially contracts back to its final resting point. This allows the other keyboard section to move out from under wrist rest 103 and pop up into the plane of the other keyboard section before it moves to its final resting position within the expanded position or configuration.

Figure 12:
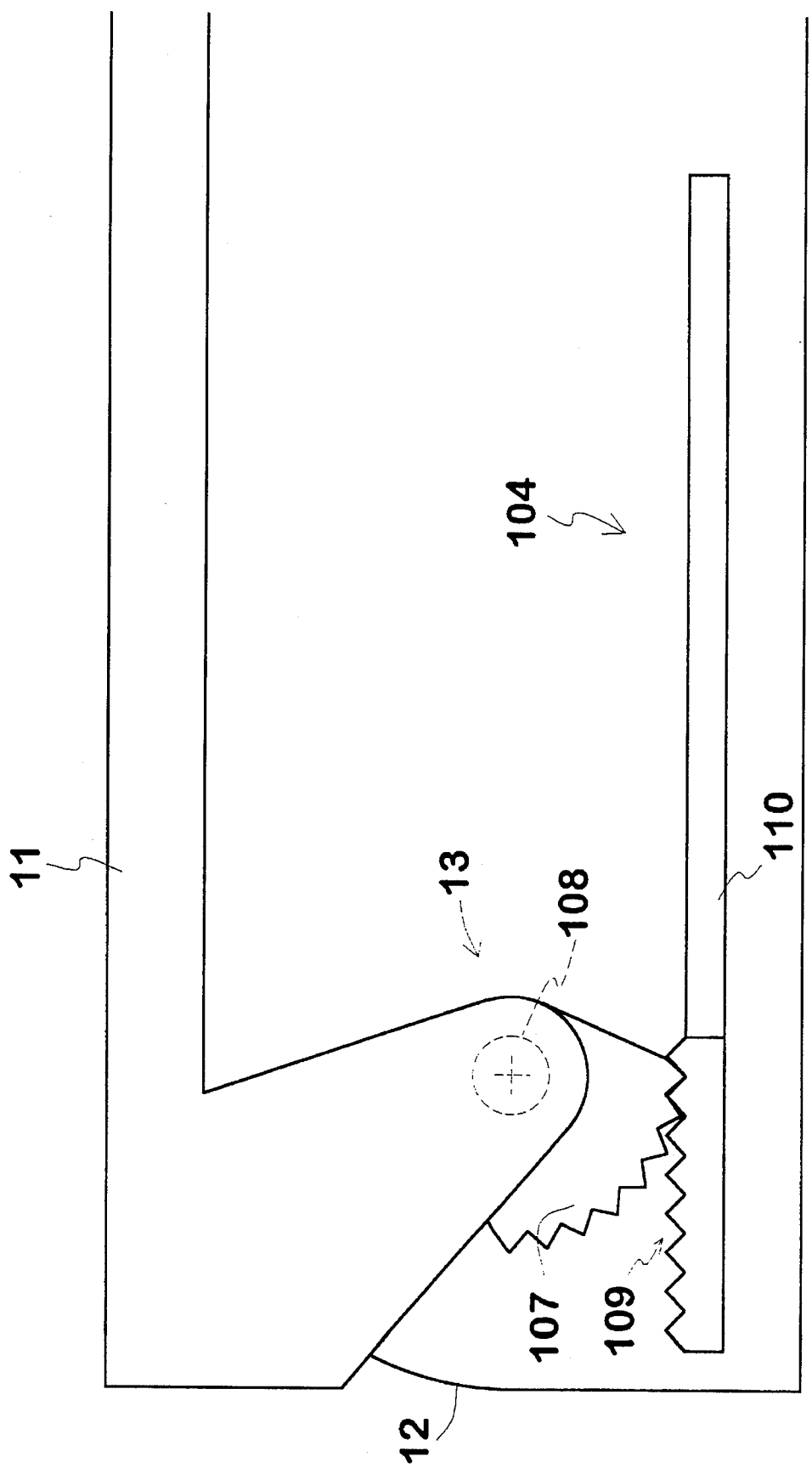
FIG. 12 is a detail representation of the hinge portion of one possible embodiment of the translation assembly for both the right and left sides of the keyboard, the right side being a mirror image of the one illustrated, shown in the collapsed position.
Figure 13:
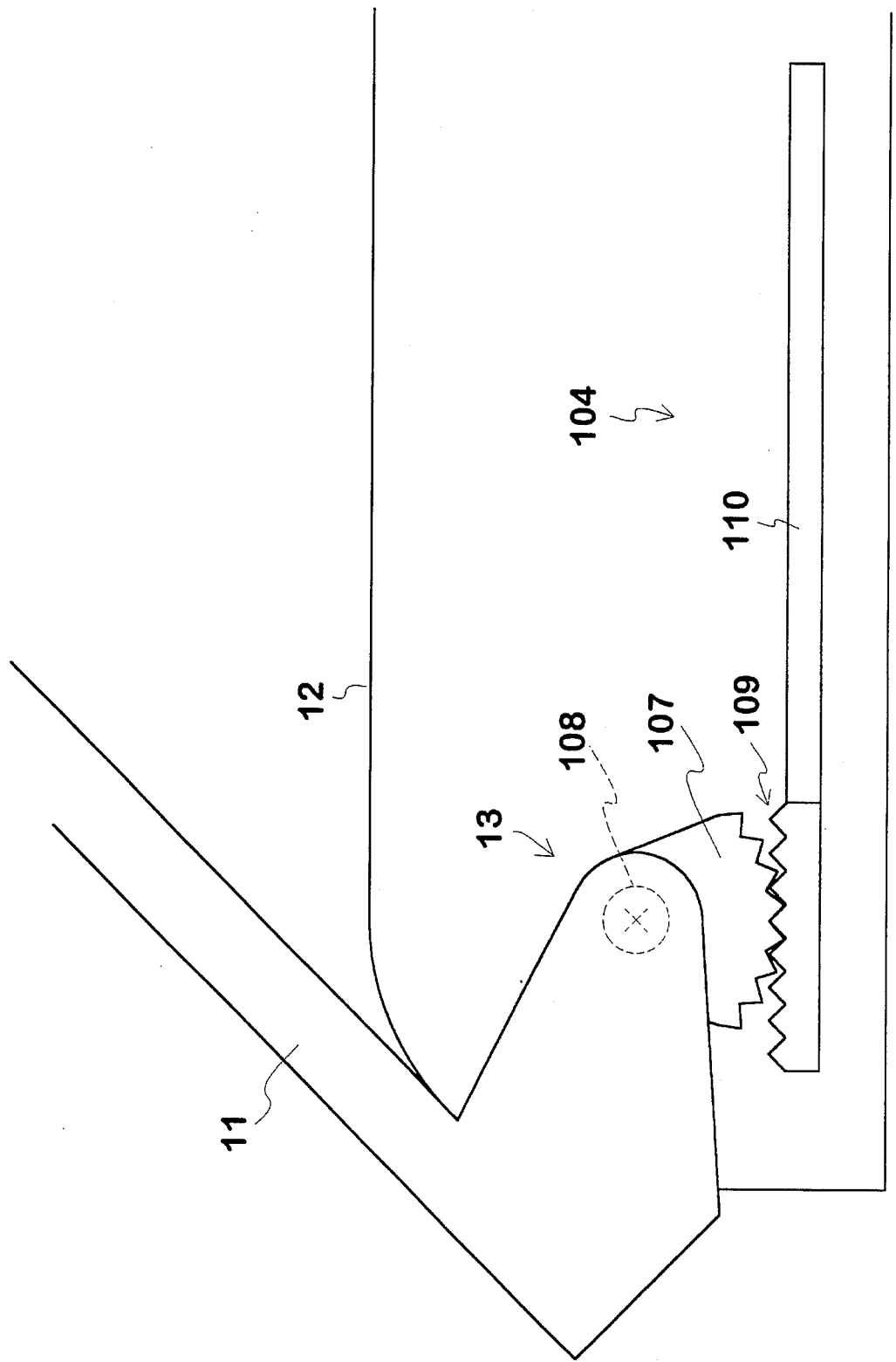
FIG. 13 is a detail representation of the translation assembly portion of FIG. 12 in a partially expanded position.
Figure 14:
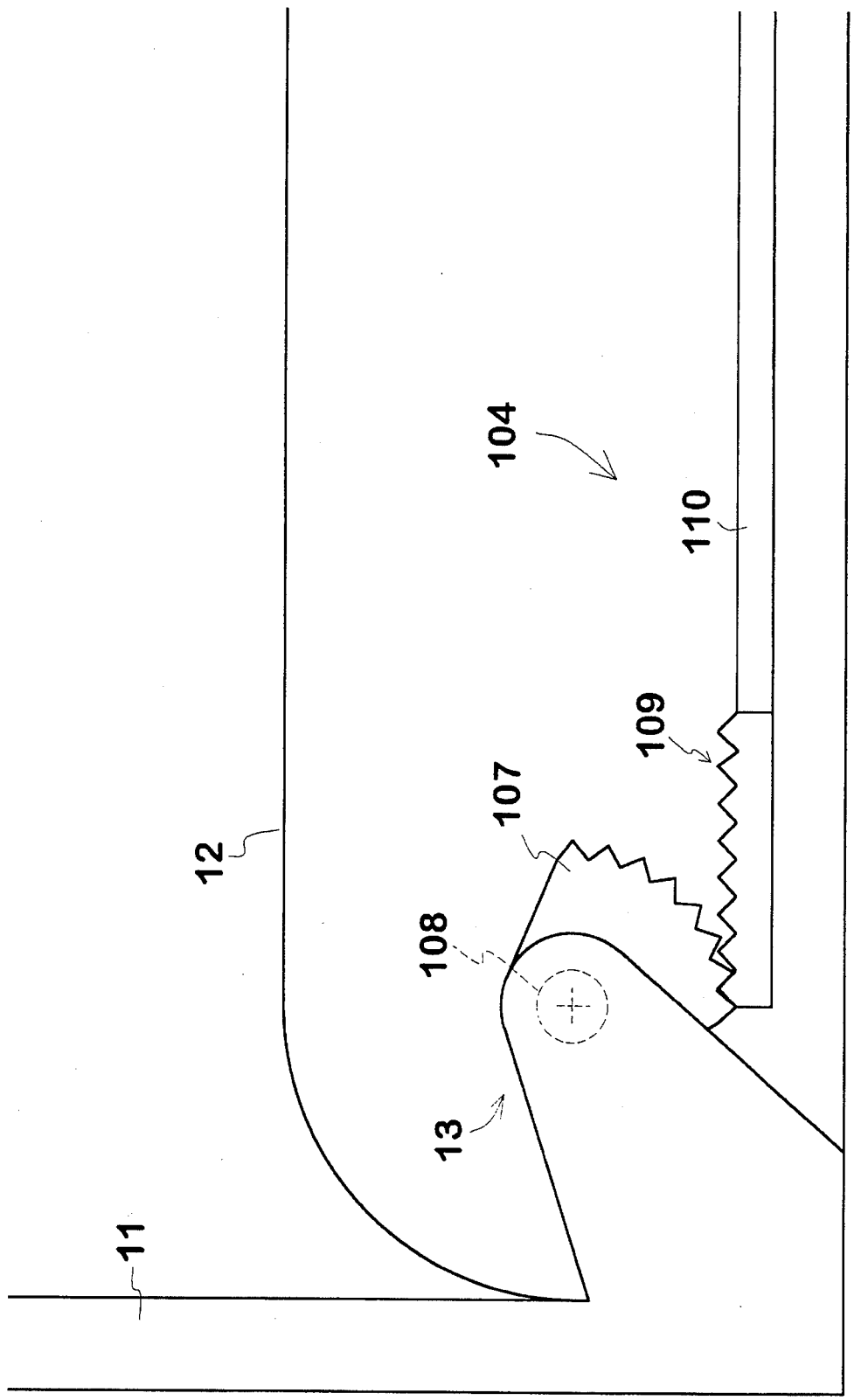
FIG. 14 is a detail representation of the translation assembly portion of FIG. 12 in a fully expanded position.
Figure 15:
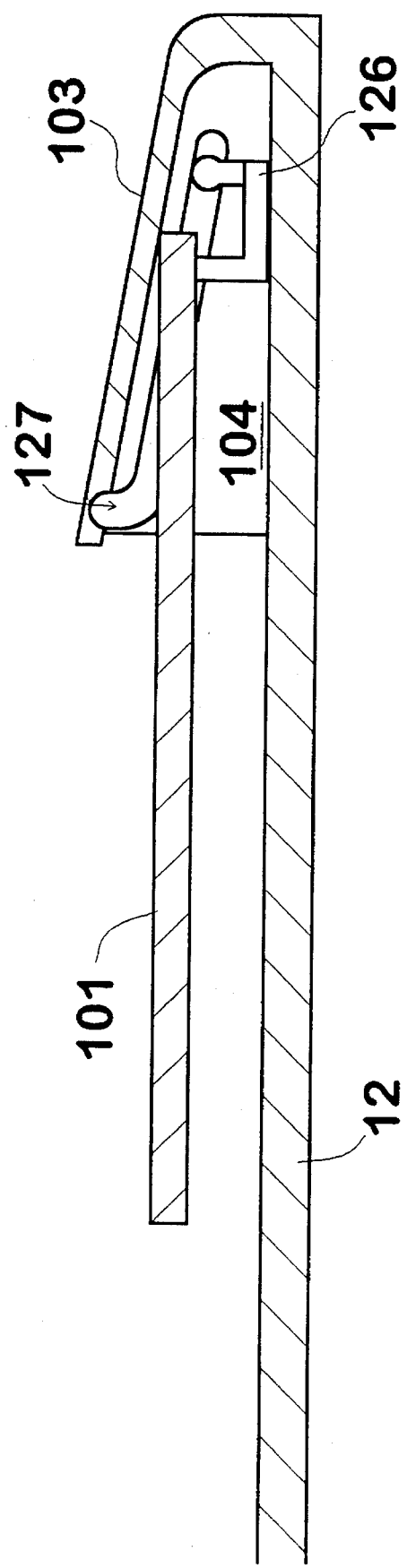
FIG. 15 is a cross section detail representation of the left side of the keyboard in the collapsed position.
Figure 16:
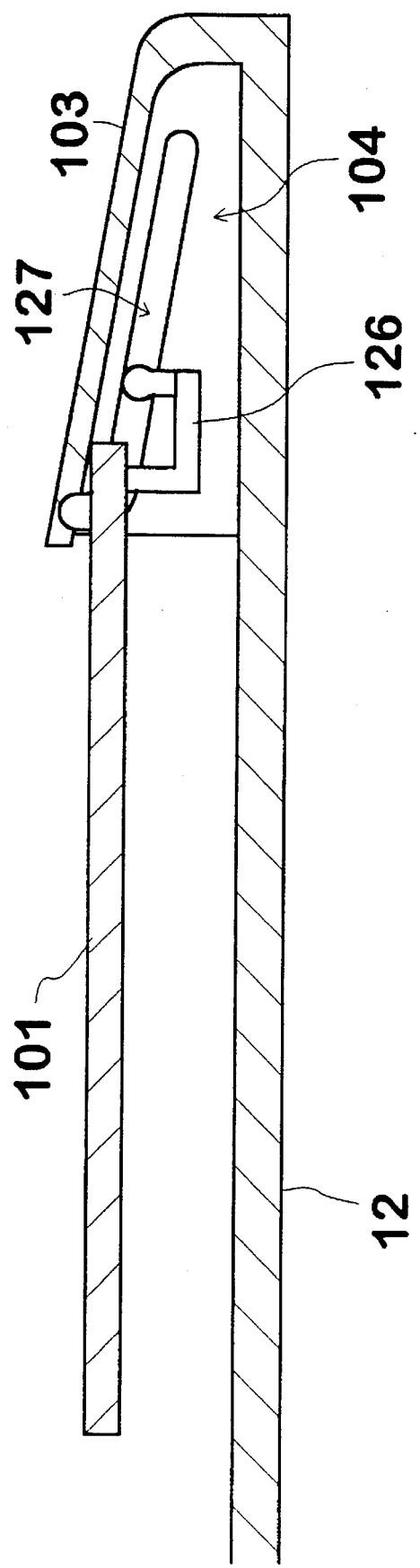
FIG. 16 is a cross section detail representation of the left side of the keyboard in the partially expanded position.
Figure 17:
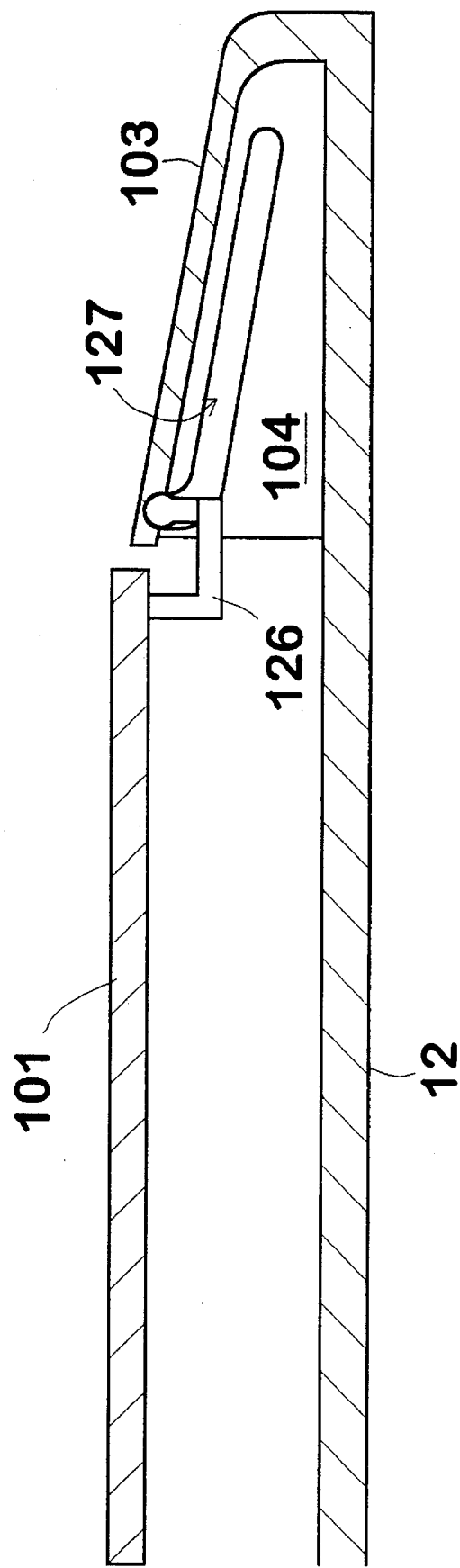
FIG. 17 is a cross section detail representation of the left side of the keyboard in the expanded position.

Both the leer translation assembly 104 and the right translation assembly 105 are hinge activated. FIGS. 12–14 are detail representations of the leer hinge actuator portion of left translation assembly 104. The hinge actuator for right translation assembly 105 mirrors left translation assembly 104 and therefore is not illustrated. Hinge 13 includes a pinion gear segment 107 which rotates about hinge pin 108 in concert with screen/lid 11. Hinge pin 108 is fixed to main housing 12. A first linear translation arm, here left linear translation arm 110 has a first rack gear segment 109 positioned to and in meshed engagement with the teeth of pinion gear segment 107. Left linear translation arm 110 will move to the right in FIGS. 12–14 as pinion gear segment 107 rotates counter clockwise about hinge pin 108 which corresponds to opening screen/lid 11 of notebook computer 10.

Figure 6:
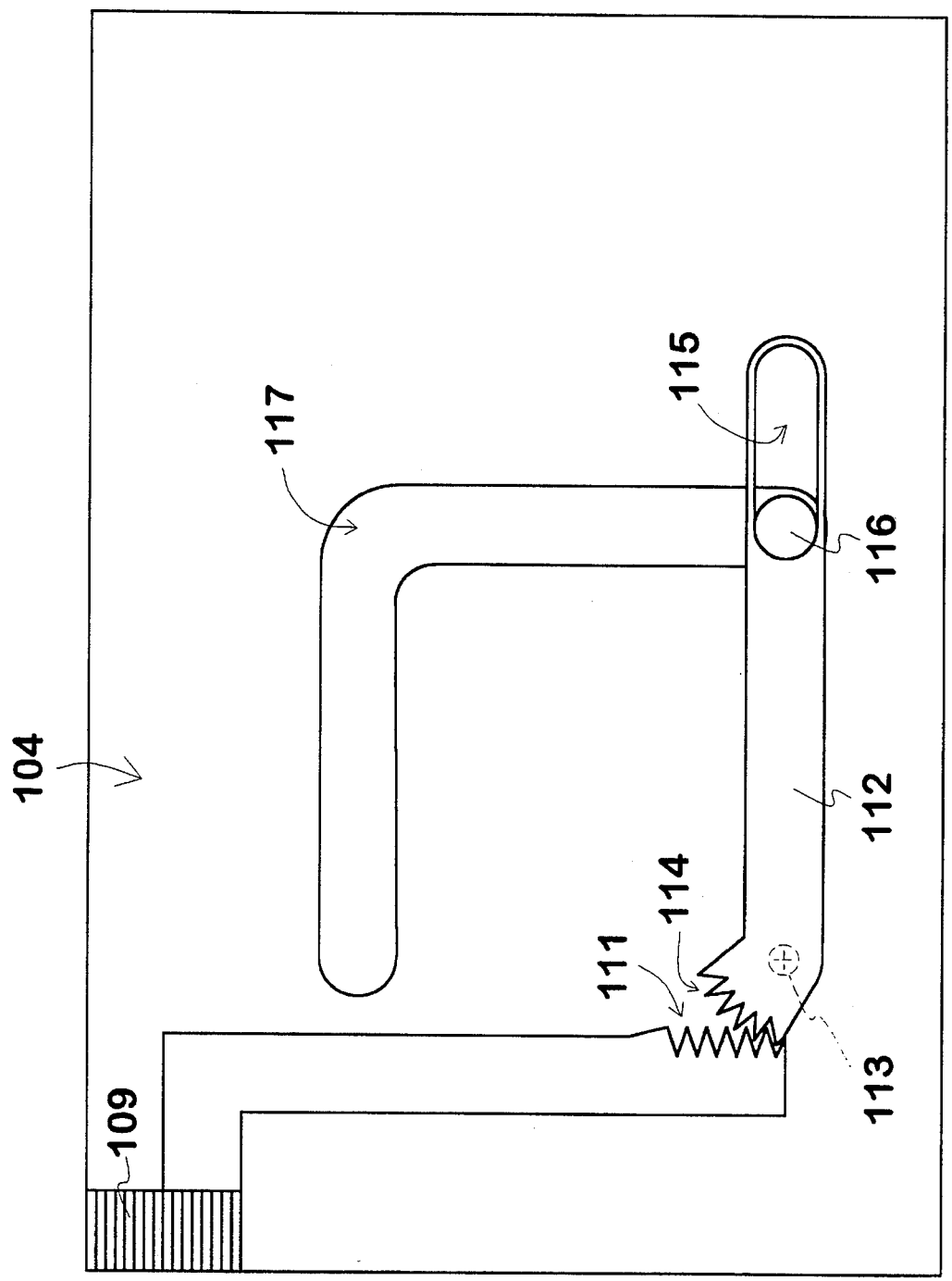
FIG. 6 is a detail representation of a portion of one possible embodiment of the translation assembly for the left side of the keyboard, shown in the collapsed position.
Figure 7:
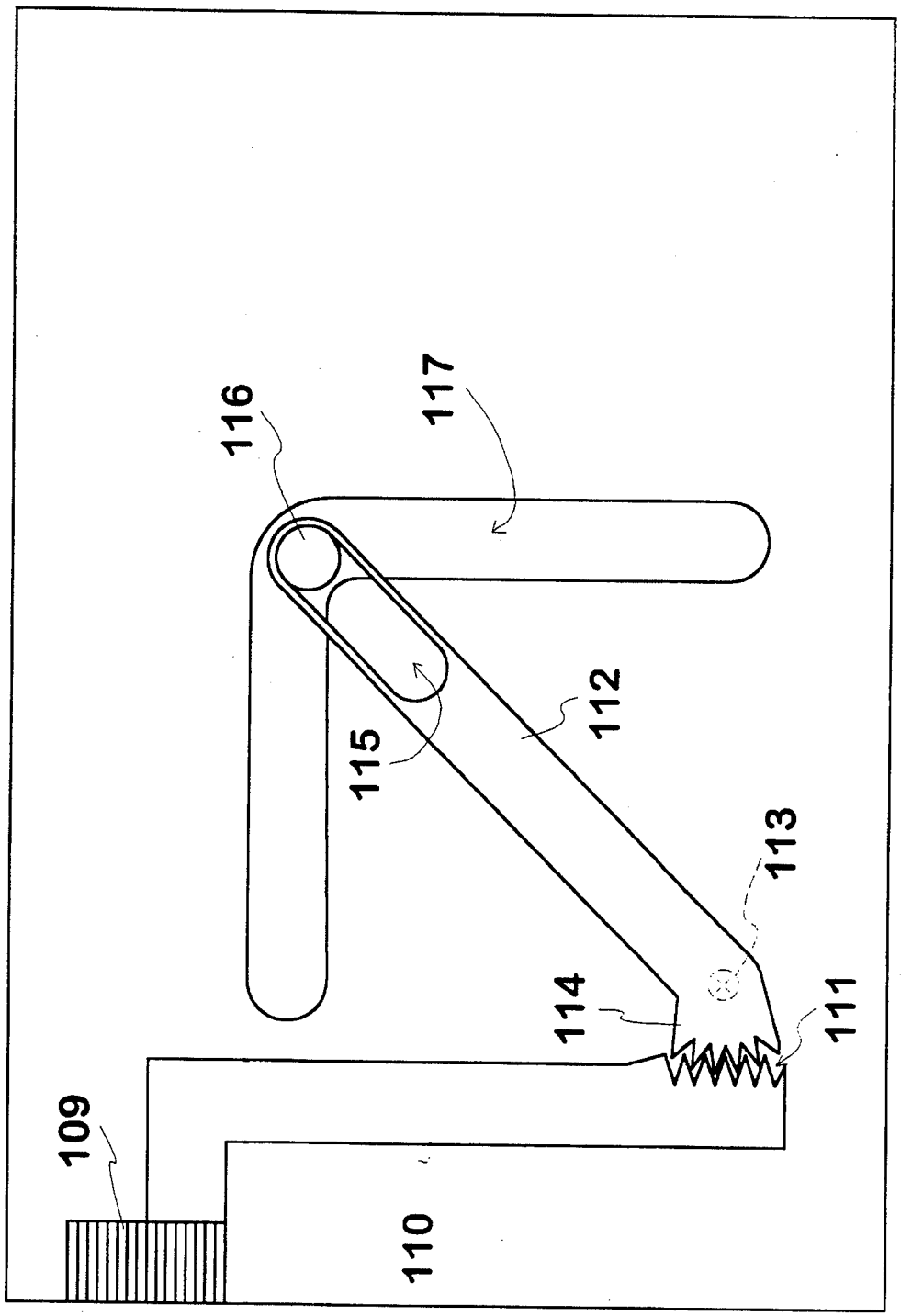
FIG. 7 is a detail representation of the translation assembly portion of FIG. 6 in a partially expanded position.
Figure 8:
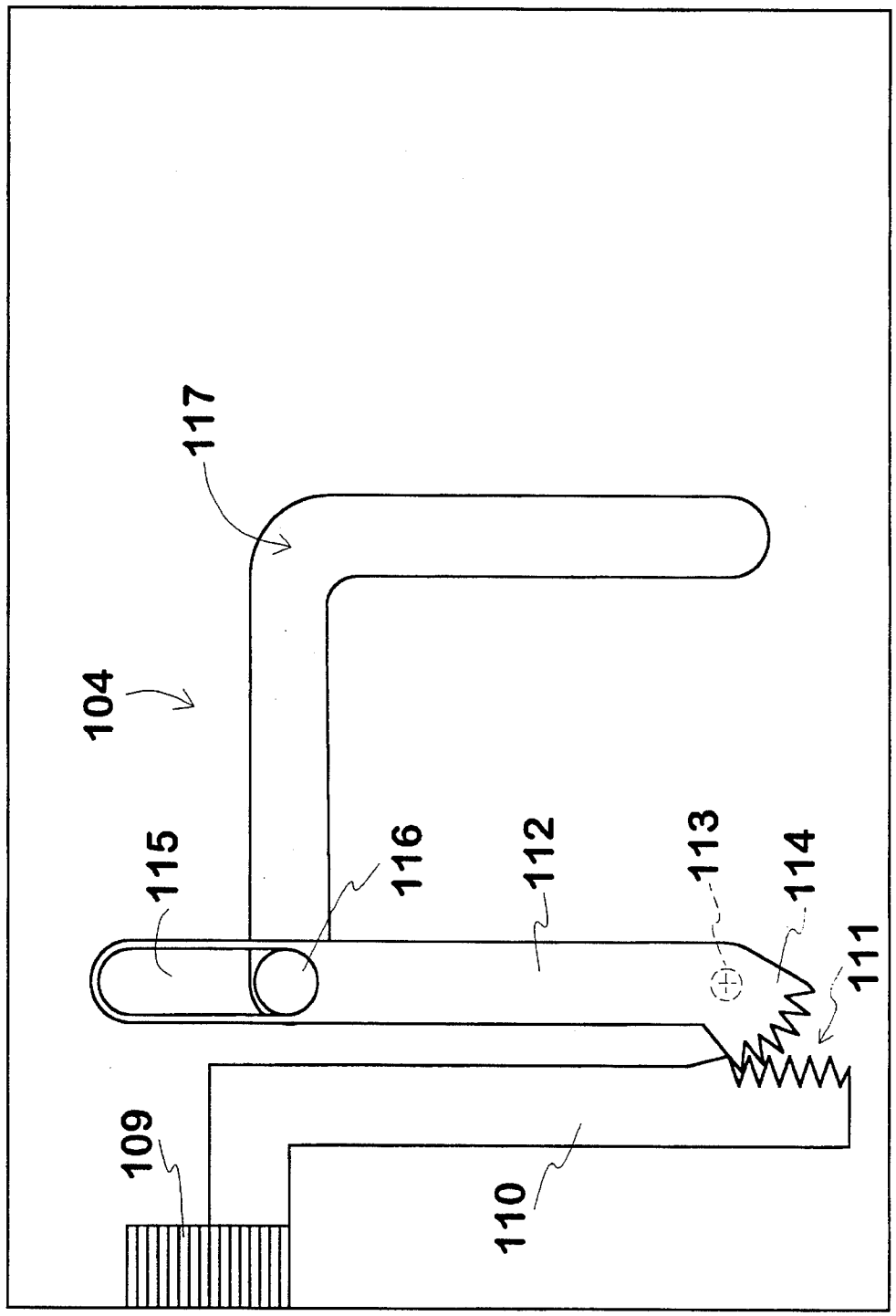
FIG. 8 is a detail representation of the translation assembly portion of FIG. 6 in a fully expanded position.

Left linear translation arm 110 has a second rack gear segment 111 whose teeth are in meshed engagement with the teeth of angular translation arm pinion gear segment 114. A linear translation of left translation arm 110 imparts an angular translation of angular translation arm 112 about pivot pin 113. This motion is illustrated in FIGS. 6–8. The distal end of angular translation arm 112 has an elongated slide hole 115 which slideably engages follower pylon 116. The lower end of follower pylon 116 is slideably engaged within pylon guide slot 117 while the upper end is fixed to the bottom of left keyboard section 101. The portion of guide slot 117 which extends from near the bottom of the figures to near the top of the figures is inclined upward from the bottom to the top. This portion accounts for the first and third degrees of freedom, i.e. moving the left keyboard section from the from of the computer to the back of the computer and raising the left keyboard section into the plane of the main keyboard. An additional guide means is provided between the front of left key board section 101 and the underside of wrist rest portion 103, as is explained below. Elongated slide hole 115 allows follower pylon 116 to "float" with respect to angular translation arm 112. Once angular translation arm 112 has rotated through 45°, follower pylon is forced to the left, in the figures, out to its final expanded position.

Figure 18:
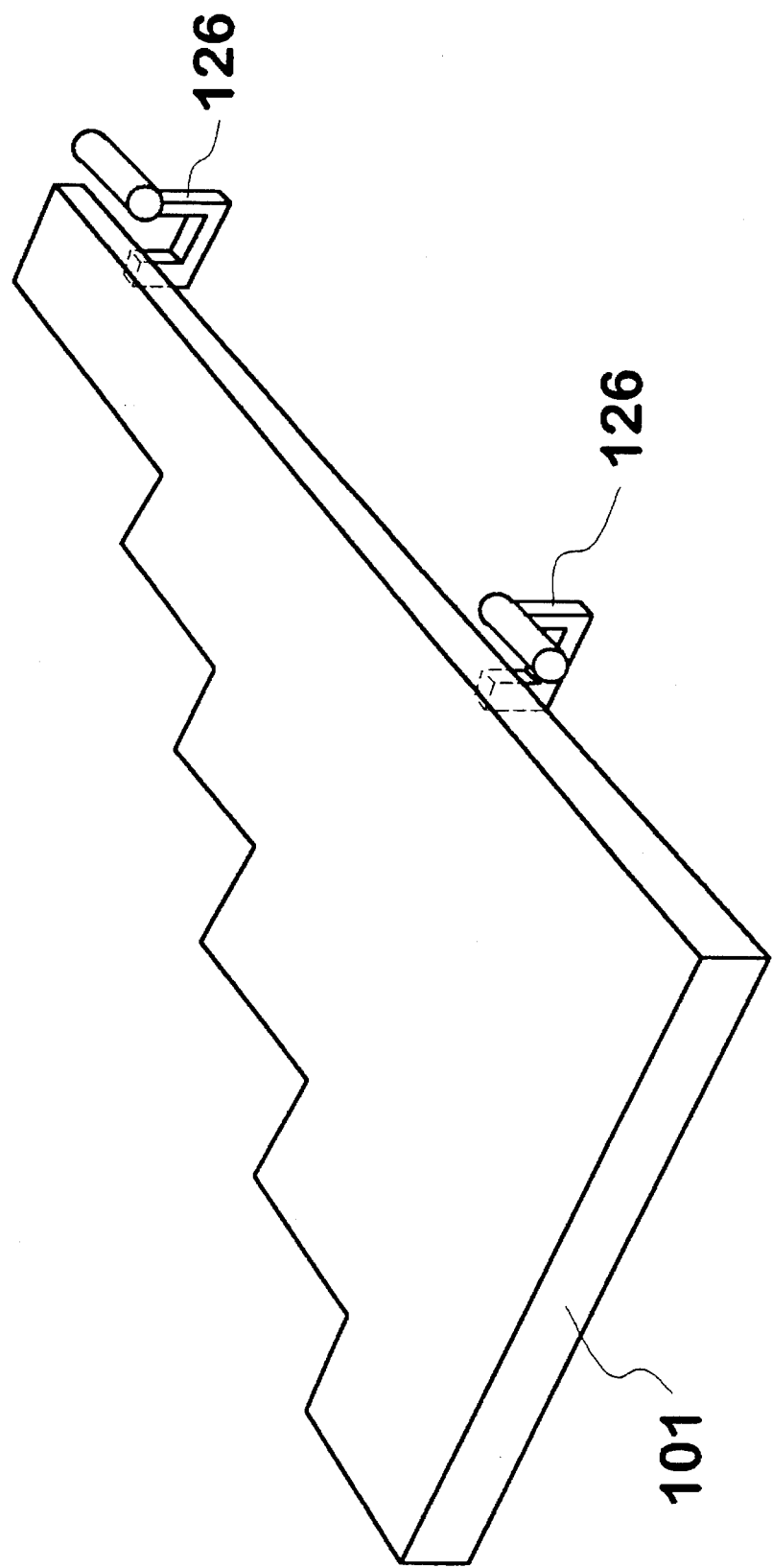
FIG. 18 is a perspective representation of the left side of the keyboard.

FIGS. 15–18 illustrate a pair of keyboard suspension support pins 126 attached to the underside of the front edge of left keyboard section 101. FIGS. 15–18 illustrate the distal most support pin 126 engaged with guide track 127 as the keyboard is expanded. While the guide track corresponding to the foremost support pin 126 of FIG. 18 is not illustrated, it should be noted that, at least in the configuration shown, this support pin does not engage its track or hole until the keyboard is almost full expanded. Alternatively, rather than employing suspension supports, pylon type supports could be used as well as employing a combination of both. Additionally, the supports could be fixedly attached to the main housing or wrist rest portion with corresponding guide slots or tracks in the sides or bottom of left keyboard section 101. Finally, translation guides other than the slot and pin type illustrated can be employed.

Figure 9:
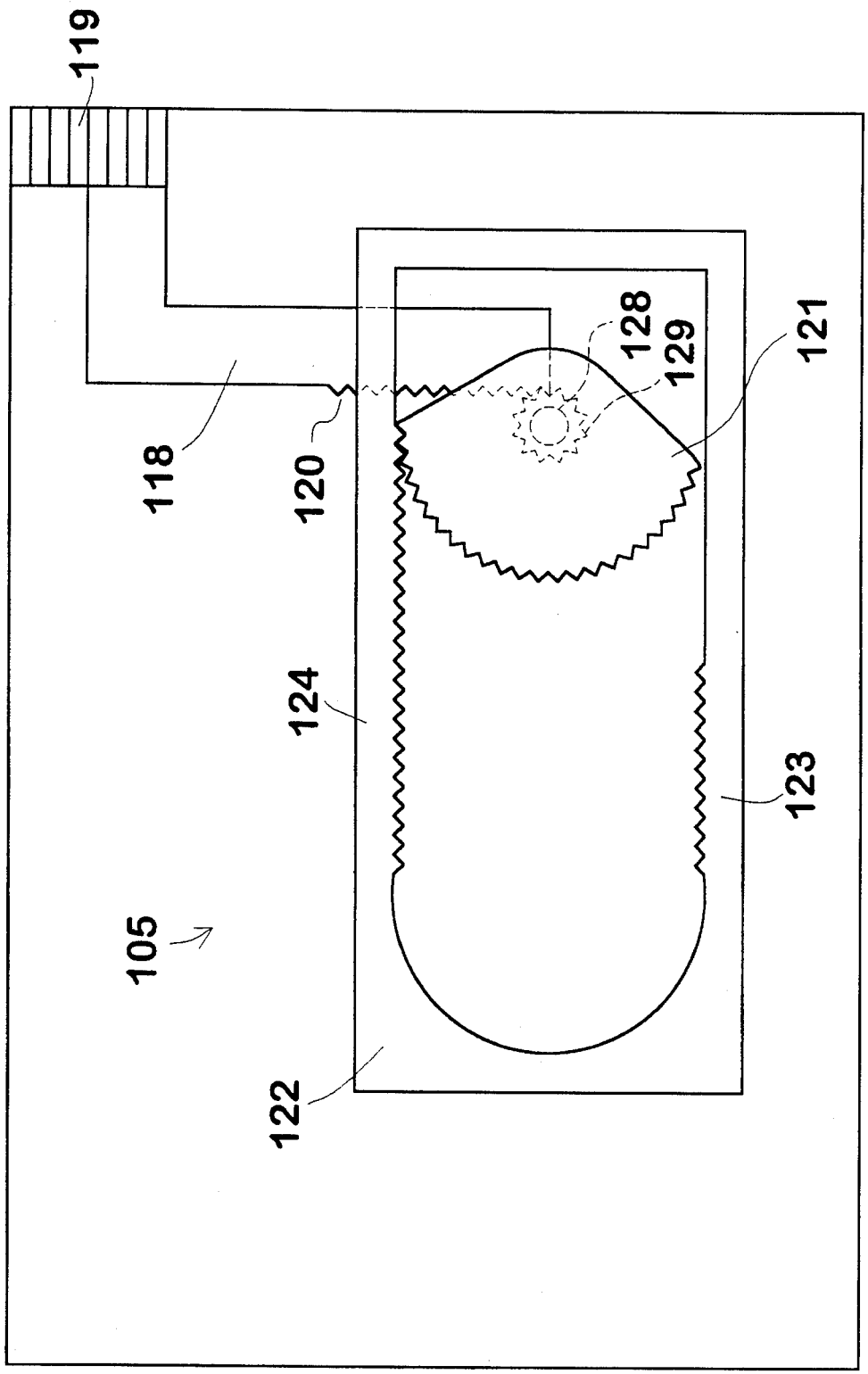
FIG. 9 is a detail representation of a portion of one possible embodiment of the translation assembly for the right side of the keyboard, shown in the collapsed position.
Figure 10:
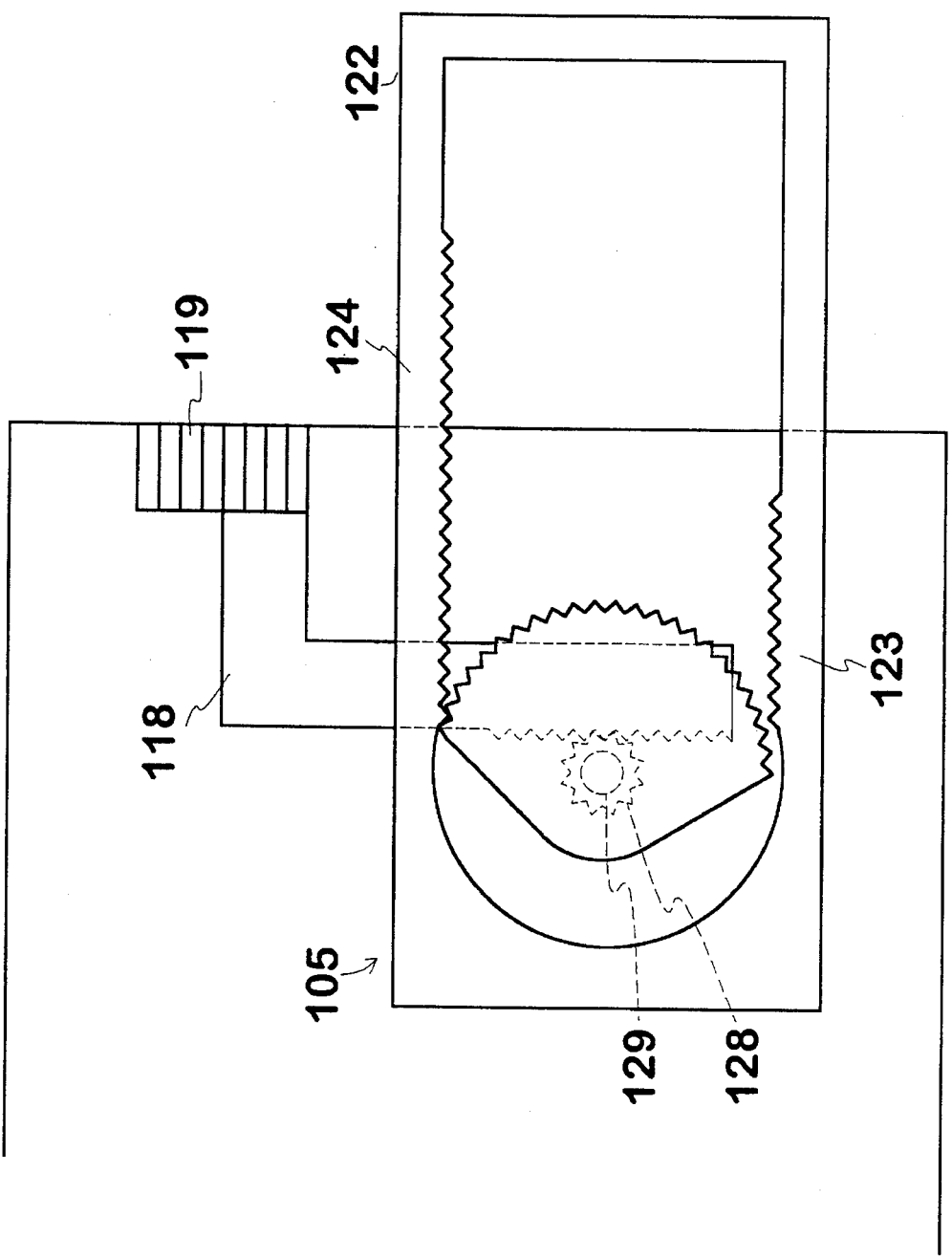
FIG. 10 is a detail representation of the translation assembly portion of FIG. 9 in a partially expanded position.
Figure 11:
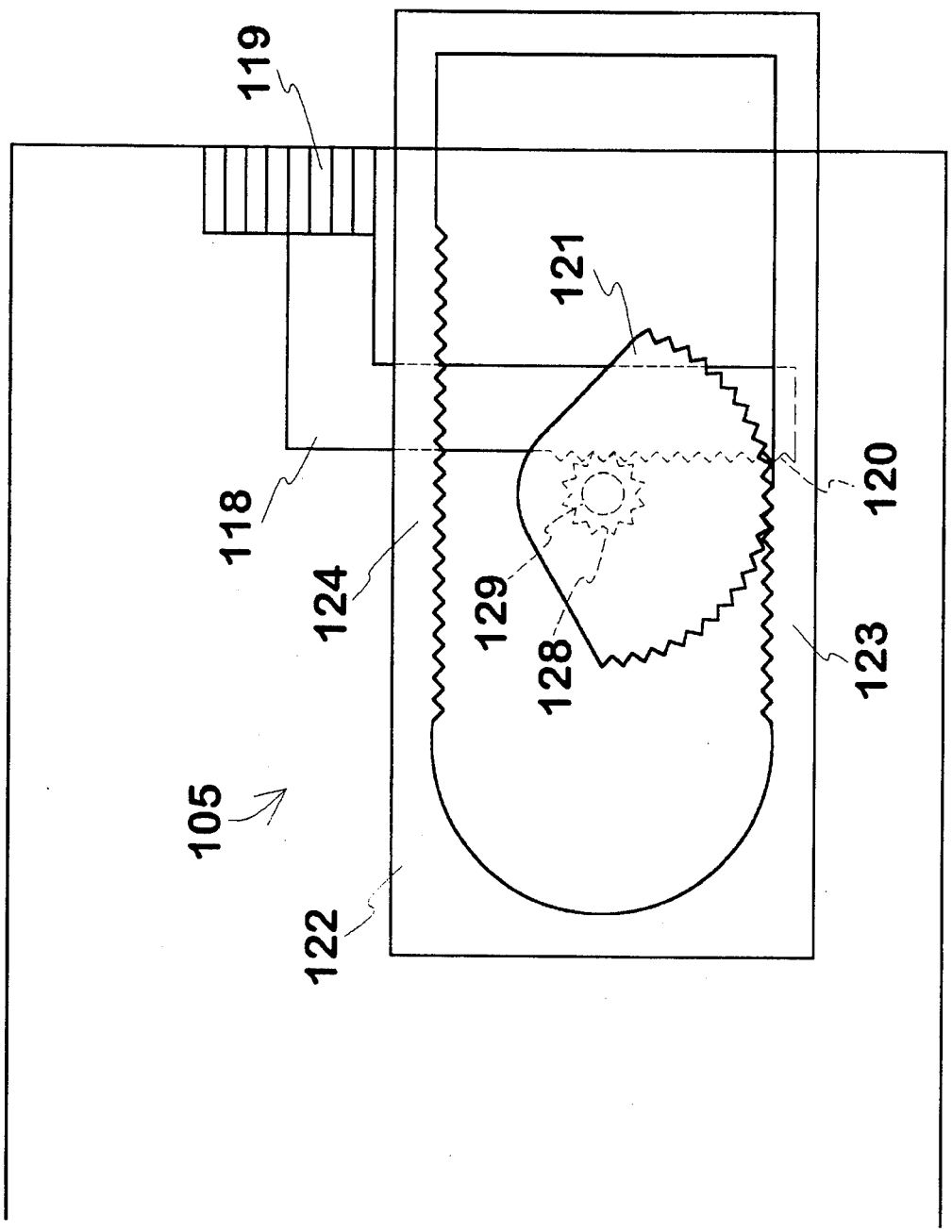
FIG. 11 is a detail representation of the translation assembly portion of FIG. 9 in a fully expanded position.

FIGS. 9–11 illustrate right translation assembly 105 as it moves from the contracted position shown in FIG. 9 to the expanded position shown in FIG. 11. A second linear translation arm, here right translation arm 118 has a rack gear segment 119 which is engaged by the pinion gear segment of the right hinge assembly. A second rack gear segment 120 is engaged with a small pinion gear 128 fixed to axle 129. A linear translation of translation arm 118 causes axle 129 to rotate. Also fixed to axle 129 is a larger segmented pinion gear 121. Segmented pinion gear 121 is meshedly engaged with the teeth of reciprocal rack gear assembly 122. Reciprocal rack gear assembly 122 carries right keyboard section 102. As translation arm 118 moves from the contracted position of FIG. 9 segmented pinion gear 121 rotates, moving reciprocal rack gear assembly 122 by engaging the teeth of back rack gear segment 124. FIG. 10 shows the assembly approximately halfway through its range of motion. This position corresponds to the right keyboard section 102 being close to its outermost position which is to the right of its final expanded position to provide the necessary clearance for left keyboard section 101. The remaining rotation of segmented pinion gear 121 brings right keyboard section 102 back into its final position by engaging front rack gear segment 123.

To close the computer and collapse the keyboard, the entire process is reversed. It should be understood that both the right and left keyboard sections move in unison. Detent catches or other suitable locking mechanisms can be employed to lock the keyboard and screen into any desired position.

While there is shown and described the preferred embodiment of the invention, it is to be distinctly understood that this invention is not limited thereto but may be variously embodied to practice within the scope of the following claims.

I claim:

1. An expandable keyboard having a wrist rest which comprises:

a housing having an elongated wrist rest portion including a cavity thereunder;

a keyboard being divided into movably separate sections; and a translation assembly operatively connected to at least one keyboard section and configured to move that section between a collapsed position having at least a portion of that section stored in the cavity and an expanded position having that section free of the cavity and positioned substantially contiguous to and in the same plane as at least one other section of the keyboard.

2. The expandable keyboard of claim 1 wherein the translation assembly is configured to provide one section of the keyboard with three degrees of freedom and another section of the keyboard with one degree of freedom.

3. The expandable keyboard of claim 2 wherein the translation assembly is hinge activated and configured to expand the keyboard upon opening the hinge and contract the keyboard upon closing the hinge.

4. The expandable keyboard of claim 1 wherein the translation assembly is hinge activated and configured to expand the keyboard upon opening the hinge and contract the keyboard upon closing the hinge.

5. The expandable keyboard of claim 4 wherein the keyboard is divided into two sections, a left section and a right section.

6. The expandable keyboard of claim 3 wherein the keyboard is divided into two sections, a left section and a right section.

7. The expandable keyboard of claim 2 wherein the keyboard is divided into two sections, a left section and a right section.

8. The expandable keyboard of claim 1 wherein the keyboard is divided into two sections, a left section and a right section.

9. A housing for a portable computer comprising:

a lower housing having an elongated wrist rest portion including a cavity thereunder;

a screen/lid assembly being pivotally attached to the lower housing;

a keyboard being divided into movably separate sections; and a translation assembly operatively connected between the lower housing and the screen/lid assembly and to at least one keyboard section to move that section between a collapsed position having at least a portion of that section stored in the cavity and an expanded position having that section free of the cavity and positioned substantially contiguous to and in the same plane as at least one other section of the keyboard.

10. The expandable keyboard of claim 9 wherein the translation assembly is configured to provide one section of the keyboard with three degrees of freedom and another section of the keyboard with one degree of freedom.

11. The expandable keyboard of claim 10 wherein the translation assembly is hinge activated and configured to expand the keyboard upon opening the hinge and contract the keyboard upon closing the hinge.

12. The expandable keyboard of claim 9 wherein the translation assembly is hinge activated and configured to expand the keyboard upon opening the hinge and contract the keyboard upon closing the hinge.

13. The expandable keyboard of claim 12 wherein the keyboard is divided into two sections, a left section and a right section.

14. The expandable keyboard of claim 11 wherein the keyboard is divided into two sections, a left section and a right section.

15. The expandable keyboard of claim 10 wherein the keyboard is divided into two sections, a left section and a right section.

16. The expandable keyboard of claim 9 wherein the keyboard is divided into two sections, a left section and a right section.

* * * * *

UNITED STATES PATENT AND TRADEMARK OFFICE
CERTIFICATE OF CORRECTION

PATENT NO. : 5,588,759
DATED : December 31, 1996
INVENTOR(S) : Gene Cloud

It is certified that error appears in the above-identified patent and that said Letters Patent is hereby corrected as shown below:

On the title page item[22];

The filing date of the patent is corrected to read: January 9, 1996.

Signed and Sealed this

First Day of September, 1998

*Attest:*

BRUCE LEHMAN

*Attesting Officer*     *Commissioner of Patents and Trademarks*